US012572281B2

(12) United States Patent
Kim

(10) Patent No.: US 12,572,281 B2
(45) Date of Patent: Mar. 10, 2026

(54) ADAPTIVE DIE SELECTION FOR BLOCK FAMILY SCAN

(71) Applicant: Micron Technology, Inc., Boise, ID (US)

(72) Inventor: Kyungjin Kim, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 127 days.

(21) Appl. No.: 18/403,255

(22) Filed: Jan. 3, 2024

(65) Prior Publication Data

US 2024/0231632 A1 Jul. 11, 2024

Related U.S. Application Data

(60) Provisional application No. 63/437,811, filed on Jan. 9, 2023.

(51) Int. Cl.
G06F 3/06 (2006.01)

(52) U.S. Cl.
CPC .......... G06F 3/0613 (2013.01); G06F 3/0659 (2013.01); G06F 3/0679 (2013.01)

(58) Field of Classification Search
CPC ..... G06F 3/0613; G06F 3/0659; G06F 3/0679
USPC ........................................................ 711/103
See application file for complete search history.

(56) References Cited

U.S. PATENT DOCUMENTS

| | | | | |
|---|---|---|---|---|
| 11,211,128 | B1* | 12/2021 | Sheperek | G11C 16/30 |
| 2017/0271603 | A1* | 9/2017 | Hattori | H10B 41/35 |
| 2021/0191617 | A1* | 6/2021 | Sheperek | G06F 12/0246 |
| 2021/0326069 | A1* | 10/2021 | Ish | G06F 3/0659 |
| 2022/0189545 | A1* | 6/2022 | Muchherla | G11C 16/0483 |

\* cited by examiner

*Primary Examiner* — Prasith Thammavong
*Assistant Examiner* — Sidney Li
(74) *Attorney, Agent, or Firm* — Schwegman Lundberg & Woessner, P.A.

(57) ABSTRACT

Aspects of the present disclosure configure a system component, such as a memory sub-system controller, to perform adaptive die selection for block family scan operations. The controller assigns a set of memory components to one or more groups of a plurality of groups based on respective storage characteristics of the set of memory components, each of the plurality of groups corresponding to different storage characteristics. The controller determines a maximum quantity of memory components to perform block family (BF) scan operations at an individual measurement period. The controller distributes the maximum quantity of memory components across the one or more groups to which the set of memory components are assigned and, at the individual measurement period, performs the BF scan operations on a portion of the set of memory components corresponding to the maximum quantity of memory components.

20 Claims, 6 Drawing Sheets

| TEMP RANGE | BIN MP | BIN 1 | BIN 2 | BIN 3 | BIN 4 | BIN 5 | BIN 6 |
|---|---|---|---|---|---|---|---|
| 0 TO 40C | 30 MIN | 30 | 60 | 240 | 960 | 1440 | 2880 |
| 30C TO 60C | 15 MIN | 15 | 30 | 120 | 480 | 720 | 1440 |
| 50C TO 90C | 10 MIN | 10 | 20 | 80 | 320 | 480 | 960 |

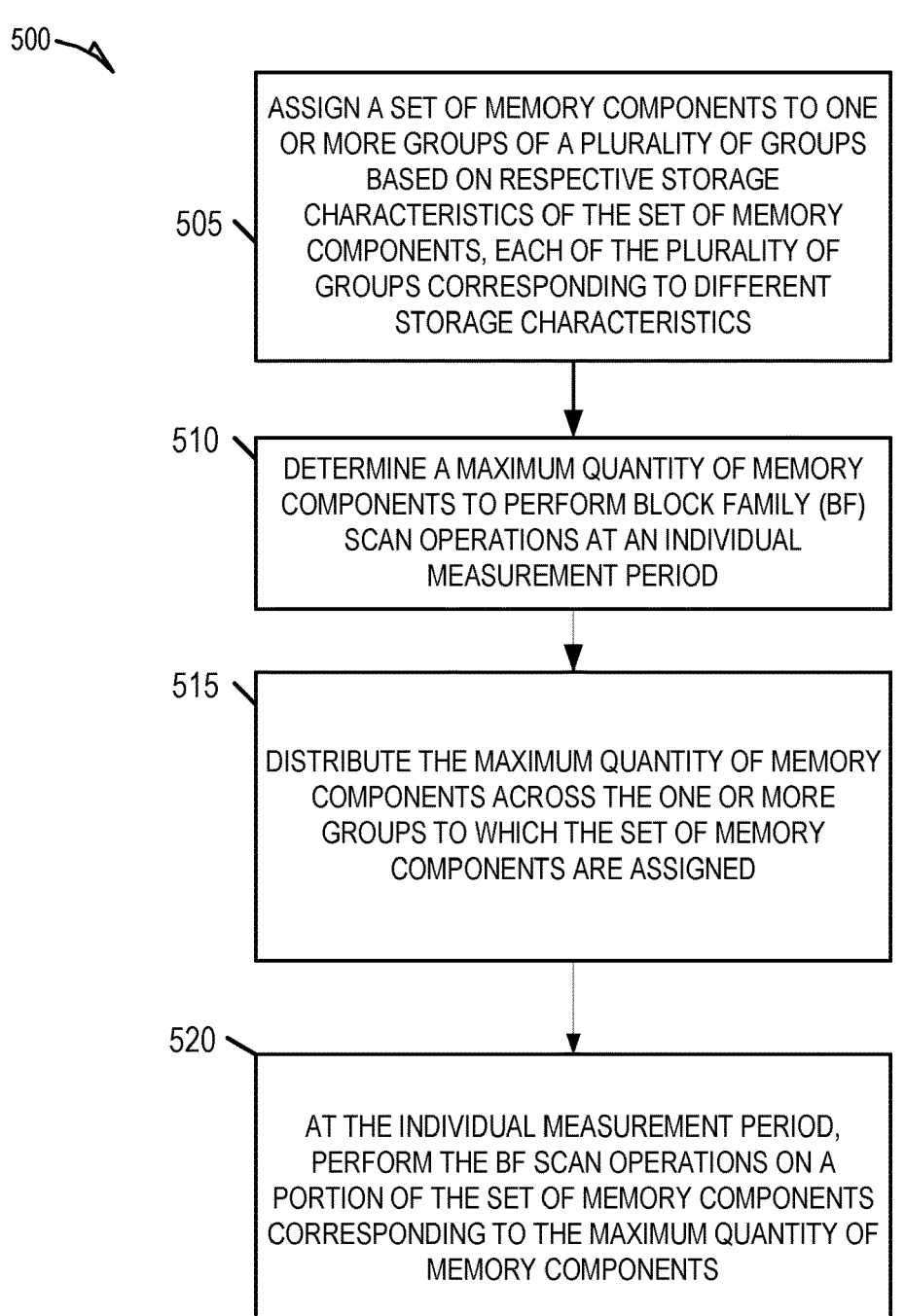

505 — ASSIGN A SET OF MEMORY COMPONENTS TO ONE OR MORE GROUPS OF A PLURALITY OF GROUPS BASED ON RESPECTIVE STORAGE CHARACTERISTICS OF THE SET OF MEMORY COMPONENTS, EACH OF THE PLURALITY OF GROUPS CORRESPONDING TO DIFFERENT STORAGE CHARACTERISTICS

510 — DETERMINE A MAXIMUM QUANTITY OF MEMORY COMPONENTS TO PERFORM BLOCK FAMILY (BF) SCAN OPERATIONS AT AN INDIVIDUAL MEASUREMENT PERIOD

515 — DISTRIBUTE THE MAXIMUM QUANTITY OF MEMORY COMPONENTS ACROSS THE ONE OR MORE GROUPS TO WHICH THE SET OF MEMORY COMPONENTS ARE ASSIGNED

520 — AT THE INDIVIDUAL MEASUREMENT PERIOD, PERFORM THE BF SCAN OPERATIONS ON A PORTION OF THE SET OF MEMORY COMPONENTS CORRESPONDING TO THE MAXIMUM QUANTITY OF MEMORY COMPONENTS

*FIG. 5*

ADAPTIVE DIE SELECTION FOR BLOCK FAMILY SCAN

PRIORITY APPLICATION

This application claims the benefit of priority to U.S. Provisional Application Ser. No. 63/437,811, filed Jan. 9, 2023, which is incorporated herein by reference in its entirety.

TECHNICAL FIELD

Embodiments of the disclosure relate generally to memory sub-systems and, more specifically, to performing adaptive block family (BF) scan operations on memory components in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 3 is a block diagram of an example BF scan measurement period table, in accordance with some implementations of the present disclosure.

FIG. 5 is a flow diagram of an example method to perform adaptive BF scan operations, in accordance with some implementations of the present disclosure.

DETAILED DESCRIPTION

Figure 1:
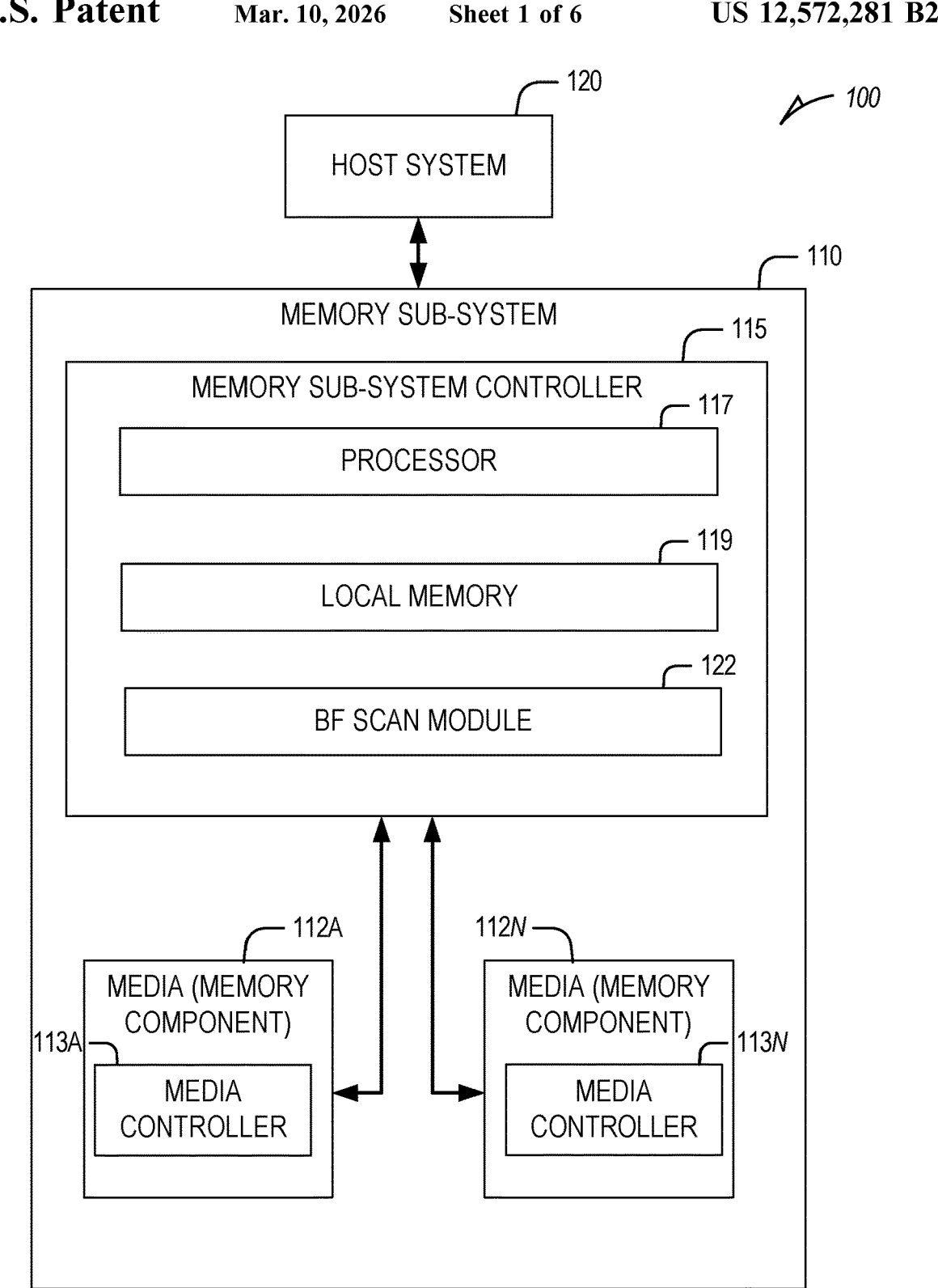
FIG. 1 is a block diagram illustrating an example computing environment including a memory sub-system, in accordance with some embodiments of the present disclosure.

Aspects of the present disclosure configure a system component, such as a memory sub-system controller, to perform adaptive BF scan operations for a memory sub-system. The memory sub-system controller can group memory components into different groups based on storage characteristics (e.g., slow charge loss (SCL) characteristics) of each memory component. Each group can include one or more memory component or can include none at all. The memory sub-system controller can determine the maximum (or reference) allowable quantity of memory components that can be included during an individual measurement period in which the BF scan operations are performed. The memory sub-system controller can then distribute the maximum allowable quantity across all of the groups that include memory components to form a subset of memory components on which the BF scan operations are performed. In this way, at any individual measurement period, the maximum allowable quantity of memory components are included in the BF scan operations which ensures that eventually all of the memory components across all of the groups are scanned quickly and efficiently, which improves the overall efficiency of operating the memory sub-system.

In some cases, the memory sub-system controller also associates a counter or timer with each memory component to ensure that no component is starved out of being scanned due to the distribution of the maximum allowable quantity across all of the groups. Namely, even though an individual memory component is not included in a group to be scanned at a measurement period, if the individual memory component counter or timer has reached a threshold, that individual memory component is included in the subset of memory components scanned in the next measurement period.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data".

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc.

The memory sub-system can initiate media management operations, such as a write operation, on host data that is stored on a memory device. For example, firmware (FW) of the memory sub-system may re-write previously written host data from a location on a memory device to a new location as part of garbage collection management operations. The data that is re-written, for example as initiated by the firmware, is hereinafter referred to as "garbage collection data".

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, NUTS data, etc.

A memory device can be a non-volatile memory device. A non-volatile memory device is a package of one or more dice. Each die can comprise one or more planes. For some types of non-volatile memory devices (e.g., NAND devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package. The memory device can be divided into one or more zones where each zone is associated with a different set of host data or user data or application.

Typical memory systems leverage superblocks, which are a collection of blocks across memory planes and/or dies. Namely, each superblock (block family (BF) can be of equal size and can include a respective collection of blocks across multiple planes and/or dies (or memory components). The superblocks, when allocated, allow a controller to simultaneously write data to a large portion of memory spanning multiple blocks (across multiple planes and/or dies) with a single address.

Usually, the memory sub-systems ensure proper storage and charge distribution of data stored on various dies or memory components. To do so, the memory sub-systems performs a BF scan operation to determine whether a current charge distribution stored in an individual memory component corresponds to the expected charge distribution. If so, the memory sub-systems can leave the individual memory component assigned to a current bin. If not, the memory sub-systems transition the individual memory component to a new bin. The bins assigned to memory components or dies control how often the BF scan operations are performed for those memory components. A timer is usually started as soon as a BF is stored to a memory component and, upon expiration of the timer, the BF scan operations are performed to check whether the memory component needs to be transitioned to a new bin where the BF scan operations are performed more frequently. In some cases, the bin assignments are also a factor of the current temperature of the memory sub-systems.

Conventional memory sub-systems memory components belong to various groups that define the storage characteristics of the memory components. The groups can represent die families (DF) when the memory components correspond to different dies. The DF represent the storage characteristics of the different memory components and indicate the reliability of storing data on a given memory component. In some cases, the memory components are grouped into five different DFs according to the rate of SCL degradation of each individual memory component. The DF grouping can be updated when a program-erase cycle (PEC) of a given memory component reaches a certain threshold. In conventional systems, the memory controller accesses the bin assigned to a BF or memory component to determine when to perform BF scan operations on the memory component of the BF. Conventional systems usually allow a maximum of 10 different memory components to be checked by performing BF scan operations during each measurement period (e.g., when a timer associated with a given bin is reached) to meet performance parameters and design constraints.

Conventional systems usually select a maximum of two dies for each group and have no mechanism to alter the quantity of dies that are checked at each measurement period. Because of this, in many cases, less than all of the allowable maximum quantity of memory components are checked at each measurement period because the conventional systems assume that there exist memory components assigned to each of the many different groups. However, oftentimes, certain groups (e.g., those associated with very high SCL rates) have no memory components of dies assigned to them. In such cases, the memory sub-systems perform the BF scan operations on two dies from each group for a total of 8 dies (if there is only one group of the five groups with no assigned dies) which wastes two dies of the maximum allowable dies that can be scanned. This creates severe inefficiencies and results in performance loss.

Aspects of the present disclosure address the above and other deficiencies by configuring a system component, such as a memory sub-system controller, to selectively distribute the reference (e.g., maximum) allowable quantity of memory components across all of the groups for which memory components are assigned at each measurement period. In this way, when a group is not assigned any memory components, the quantity of memory components (e.g., two memory components) that would otherwise have been scanned if they were assigned to that group at a given measurement period, are allocated to a different group. This results in some groups of memory components having more memory components being scanned by the BF scan operations at each measurement period than other groups and increases the overall efficiency of the memory sub-system.

In some examples, a system, including a set of memory components and a processing device operatively coupled to the set of memory components, is provided. The processing device (e.g., memory controller or FW) is configured to assign the set of memory components to one or more groups of a plurality of groups based on respective storage characteristics of the set of memory components, each of the plurality of groups corresponding to different storage characteristics. The processing device determines a reference quantity of memory components to perform block family (BF) scan operations at an individual measurement period and distributes the reference quantity of memory components across the one or more groups to which the set of memory components are assigned. The processing device, at the individual measurement period, performs the BF scan operations on a portion of the set of memory components corresponding to the reference quantity of memory components.

In some examples, the reference or maximum quantity of memory components is equally distributed across the one or more groups to which the set of memory components are assigned. In some examples, the maximum quantity of memory components is un-equally distributed across the one or more groups to which the set of memory components are assigned.

In some examples, the processing device determines, for each group of the plurality of groups, a quantity representing how many of the set of memory components is assigned to each of the one or more groups of the plurality of groups. The processing device distributes the reference or maximum quantity of memory components across the one or more groups based on the quantity determined for each group of the plurality of groups.

In some examples, the processing device determines that a first quantity of the set of memory components assigned to a first group of the plurality of groups is greater than a second quantity of the set of memory components assigned to a second group of the plurality of groups. The processing device assigns a greater number of the reference or maximum quantity of memory components to the first group than the second group.

In some examples, the portion of the set of memory components includes a first number of the set of memory components assigned to the first group and a second number of the set of memory components assigned to the second group, the first number being greater than the second number. In such cases, the processing device performs the BF scan operations on the first number of the set of memory components and the second number of the set of memory components at the individual measurement period.

In some examples, the processing device identifies first and second groups of the plurality of groups that are assigned greater quantities of the set of memory components than a third group of the plurality of groups. The processing device increments a quantity of memory components of the first and second groups that are included in the portion of the set of memory components while maintaining a quantity of memory components of the third group at a predetermined amount. In some examples, the processing device associates a bin of a plurality of bins with each of the set of memory components, each of the plurality of bins representing a different measurement period for performing the BF scan operations, and determines the individual measurement period based on the associated bin of each of the set of memory components.

In some examples, the plurality of bins is defined according to an elapsed time since data has been programmed into an individual memory component of the set of memory components and a current temperature of the set of memory components. In some examples, the processing device, at the individual measurement period, defines the portion to include a first set of the memory components including a first quantity of the set of memory components assigned to a first group of the plurality of groups and a second quantity of the set of memory components assigned to a second group of the plurality of groups, the first quantity being different from the second quantity. The processing device, at a subsequent measurement period that follows the individual measurement period, defines the portion to include a second set of the memory components including the first quantity of the set of memory components assigned to the first group and the second quantity of the set of memory components assigned to the second group.

In some examples, the processing device, after a plurality of measurement periods, determines that the BF scan operations have been performed on all of the memory components assigned to the first group. The processing device in response to determining that the BF scan operations have been performed on all of the memory components assigned to the first group, increments the second quantity of the set of memory components assigned to the second group that is included in the portion to be scanned by the BF scan operations at a later measurement period that is performed after the plurality of measurement periods. In some examples, the processing device associates a counter with each of the set of memory components and performs the BF scan operations on an individual memory component of the set of memory components before the counter reaches a threshold. The counter can be adjusted by an individual amount each time BF scan operations are performed.

In some examples, the processing device selects the individual amount that is used to adjust the counter based on a temperature of the individual memory component. In such cases, the individual amount includes a first amount for a first range of temperatures, the individual amount includes a second amount for a second range of temperatures, and the second amount being greater than the first amount and the second range of temperatures being greater than the first range of temperatures.

In some examples, the set of memory components include a plurality of memory dies. In some examples, the storage characteristics of the set of memory components include SCL characteristics. In some examples, the different storage characteristics corresponding to each of the plurality of groups include different rates of SCL characteristics. In some examples, the BF scan operations include comparing a current SCL for an individual memory component to a default SCL associated with a bin assigned to the individual memory component and changing the bin assigned to the individual memory component based on comparing the current SCL to the default SCL.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices" or "dies"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS)

interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals (e.g., download and commit firmware commands/requests) between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory.

In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), three-dimensional (3D) NAND, and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages, blocks, BFs, or superblocks that can refer to a unit (or portion) of the memory component 112 used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor 117 (processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive I/O commands or operations from the host system 120 and can convert the commands or operations into instructions or appropriate commands to achieve the desired access to the memory components 112A to 112N. The memory sub-system controller 115 can be responsible for other operations, based on instructions stored in firmware, such as wear leveling operations, garbage collection operations, error detection and ECC operations, decoding operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the I/O commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115. Each memory component 112A-N can represent an individual physical die or collection of dies.

In some embodiments, the memory sub-system controller 115 can include a BF scan module 122. The BF scan module 122 can include sense circuitry, such as sense amplifiers, configured to determine the values of data on (e.g., read), or to determine the values of data to be written to, memory cells of the set of memory components 112A to 112N. For example, in a selected string of memory cells, one or more of the sense amplifiers can read a logic level in the selected memory cell in response to a read current (charge distribution) flowing in the memory array through the selected string to the data lines. In some cases, the read current (charge distribution) is compared to a read trim value (also referred to as a read level threshold voltage) or level, and based on whether the read current (charge distribution) exceeds or transgresses the read trim value, the corresponding logic level can be determined. In some cases, the read level threshold controls the read level used to read the charge stored in a given cell. Over time the charge distribution stored in the cell can leak and so the read level threshold can be combined with a positive or negative offset to adjust for such leakage and to accurately read the charge distribution.

While certain embodiments refer to a comparison to a read level threshold voltage, similar techniques can be applied to comparing the read current to a read level threshold current. Over time, the current and/or voltage (charge distribution) that is stored by the string of memory cells can degrade and leak. This results in an increase in the bit error rate when the data is read using a specific trim value or read by applying a specific read level threshold voltage to a cell to obtain the stored charge distribution. To address these issues, the disclosed techniques adaptively modify the trim value or offset applied to the read level based on the duration of time the data (charge distribution) has been stored by the memory cells. In some examples, the trim value is increased and in other cases the trim value is decreased. This improves the ability to accurately convert charge distributions stored by the memory cells to the logical value or logical level, which reduces the bit error rate.

In order to accurately modify the trim values at the optimal or most efficient time and manner, the BF scan module 122 performs one or more BF scan operations during different measurement periods. Specifically, the BF scan module 122 can associate an individual BF or memory component 112A-N with one bin of a set of bins after data has been stored or programmed into the individual BF or memory component 112A-N for a period of time (e.g., 1 hour). After that period of time, the individual BF or memory component 112A-N is scanned according to a measurement period defined by the bin assigned to the individual BF or memory component 112A-N. The bin can be assigned based on the amount of time that the data has been stored in the individual BF or memory component 112A-N and/or based on a current temperature of the memory component 112A-N in which the BF has been stored. Once the measurement period of the currently assigned bin elapses, the BF scan module 122 performs BF scan operations on a portion, set or collection of memory components 112A-N to verify and check whether the individual BF or memory component 112A-N needs to be moved or assigned to another bin. In some cases, the BF scan module 122 automatically transitions the individual BF or memory component 112A-N to a next bin after the measurement period elapses.

The BF scan operations can only be performed on a limited maximum number or quantity of memory components 112A-N (e.g., 10 maximum number of dies) at each measurement period due to design and operational constraints. Because of this, the BF scan module 122 needs to intelligently and dynamically select which of the many memory components 112A-N (e.g., 512 memory components) are included in the BF scan operations that are performed at a particular measurement period. To do so, the BF scan module 122 groups the memory components 112A-N into one or more groups based on their respective storage characteristics (SCL characteristics). Some groups may have no memory components 112A-N assigned while other groups have more memory components 112A-N assigned than others. The assignment is purely based on the storage characteristics and can change over time. As such, the BF scan module 122 computes weights for each group that has memory components 112A-N assigned, such as based on the quantity of memory components 112A-N currently assigned to the group. Then, the BF scan module 122 distributes the maximum allowable quantity of memory components 112A-N that can be scanned in a particular measurement period based on the weights. For example, the BF scan module 122 can form a subset that will be scanned by the BF scan operations and that includes the maximum allowable quantity of memory components. The memory components 112A-N included in the subset can be selected based on the weights so that more memory components 112A-N from a first group that is assigned a first weight are included in the subset than memory components 112A-N from a second group that is assigned a second weight lower than the first weight. In this way, the quantity of memory components 112A-N that are scanned at each measurement period is maximized to the allowable design constraints.

In some cases, the BF scan module 122 also associates timers or counters with each BF and each memory component 112A-N. The timer or counter can be decremented or incremented at each measurement period until the timer or counter reaches a threshold value. Once the timer or counter reaches or transgresses the threshold value, the BF scan module 122 includes the memory components 112A-N for which the timer or counter has transgressed or reached the threshold value in the next subset of memory components that are scanned. This ensures that even if the memory components 112A-N are assigned a very low weight and is not scheduled to be scanned for a long time (e.g., after many measurement periods elapse), the memory components 112A-N are scanned before the timer or counter has transgressed or reached the threshold value to ensure the data integrity is maintained. The timer or counter can be decremented or incremented to reach the threshold value much faster for higher temperature ranges. In some cases, there exist three temperature ranges: when the memory components 112A-N are within a first temperature range, the timer or counter is adjusted by a first amount (e.g., a single value); when the memory components 112A-N are within a second temperature range, the timer or counter is adjusted by a second amount (e.g., a second value that is double the single value); and when the memory components 112A-N are within a third temperature range, the timer or counter is adjusted by a third amount (e.g., a third value that is triple the single value or double the second value).

Depending on the embodiment, the BF scan module 122 can comprise logic (e.g., a set of transitory or non-transitory machine instructions, such as firmware) or one or more components that causes the memory sub-system 110 (e.g., the memory sub-system controller 115) to perform operations described herein with respect to the BF scan module 122. The BF scan module 122 can comprise a tangible or non-tangible unit capable of performing operations described herein.

Figure 2:
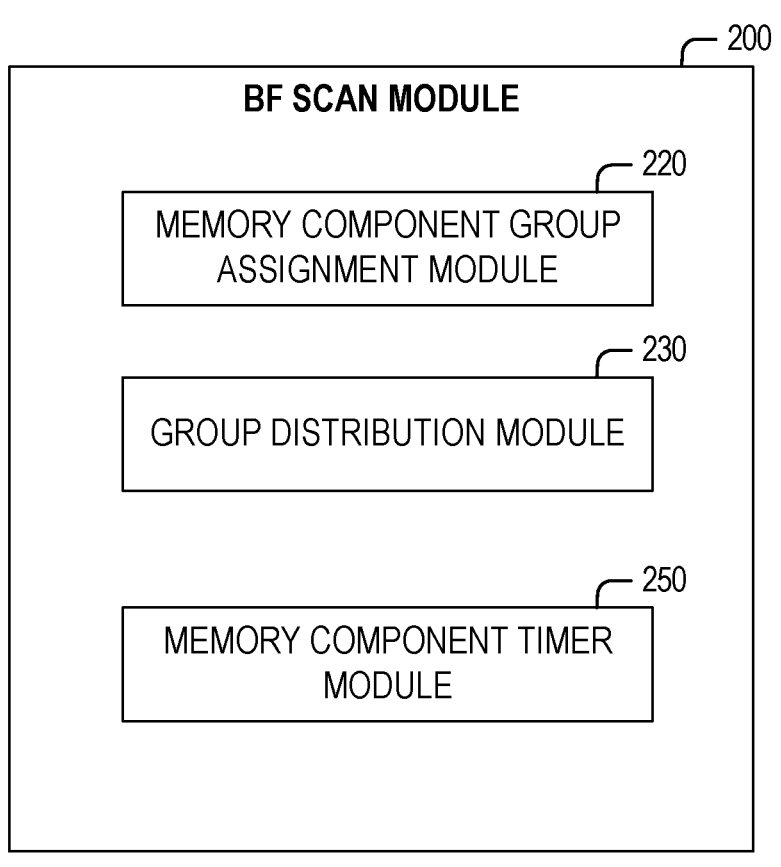
FIG. 2 is a block diagram of an example BF scan module, in accordance with some implementations of the present disclosure.

FIG. 2 is a block diagram of an example BF scan module 200, in accordance with some implementations of the present disclosure. The BF scan module 200 can represent the BF scan module 122 of FIG. 1. As illustrated, the BF scan module 200 includes a memory component group assignment module 220, a group distribution module 230, and a memory component timer module 250.

The BF scan module 200 assigns the set of memory components to one or more groups of a plurality of groups based on respective storage characteristics of the set of memory components, each of the plurality of groups corresponding to different storage characteristics. The BF scan module 200 determines a maximum quantity of memory components to perform BF scan operations at an individual measurement period and distributes the maximum quantity of memory components across the one or more groups to which the set of memory components are assigned. The BF scan module 200, at the individual measurement period, performs the BF scan operations on a portion of the set of memory components corresponding to the maximum quantity of memory components.

For example, the memory component group assignment module 220 accesses configuration data associated with the memory components 112A-N to determine the group distribution parameters for the memory components 112A-N. Specifically, the configuration data can associate different storage characteristics (e.g., ranges of SCL characteristics) with each group of five separate groups. The memory component group assignment module 220 accesses, computes, or determines the current storage characteristics of each of the memory components 112A-N to assign the set of memory components 112A-N to one or more groups of a plurality of groups based on respective storage characteristics of the set of memory components 112A-N. For example, the memory component group assignment module 220 can assign a first collection of the set of memory components 112A-N to a first group based on determining that the current SCL characteristics of the first collection of the set of memory components 112A-N corresponds to the range of SCL characteristics of the first group. The memory component group assignment module 220 can assign a second collection of the set of memory components 112A-N (that includes the rest of the memory components not included in the first collection) to a second group based on determining that the current SCL characteristics of the second collection of the set of memory components 112A-N corresponds to the range of SCL characteristics of the second group. In such cases, the third, fourth, and fifth groups can remain empty or have no memory components 112A-N currently assigned. This can change later over time as the performance of the memory components 112A-N degrades.

After assigning the memory components 112A-N to the groups, the BF scan module 200 assigns BF to different bins that control the measurement periods for performing BF scan operations on the set of memory components 112A-N.

FIG. 3 is a block diagram of an example BF scan measurement period table 300, in accordance with some implementations of the present disclosure. The table 300 includes a plurality of bins 310 (e.g., BIN 1, BIN 2, BIN 3, and BIN 4). Each bin in a first group of bins is associated with a respective time interval corresponding to a first temperature range 320 and each bin in a second group of bins is associated with a respective time interval corresponding to a second temperature range 330. Initially, when a BF is created or closed, the BF is associated with the first bin (e.g., BIN 1). Any data read from the partition while the partition is associated with the first bin is read using a read level offset defined by the respective read level offset (e.g., OFFSET 1). Also, the measurement period of the BF assigned to the first bin can be defined as 30 minutes if the current temperature falls within the first temperature range 320 and can be defined as 15 minutes if the current temperature falls within the second temperature range 330. After the measurement period defined by the first bin elapses (e.g., after 30 minutes or 15 minutes), the BF is transitioned to be associated with an adjacent second bin (e.g., BIN 2) and/or a BF scan operation is triggered on a portion of the set of memory components 112A-N that includes no more than the maximum allowable quantity of memory components 112A-N.

Referring back to FIG. 2, upon reaching the measurement period for an individual BF or memory component 112A-N, the group distribution module 230 generates or forms a subset of memory components 112A-N to include in BF scan operations that are triggered or performed. For example, the group distribution module 230 divides the maximum allowable quantity of memory components 112A-N equally or un-equally across all groups to which memory components 112A-N are assigned. In some cases, the group distribution module 230 determines that there exist three groups with memory components 112A-N assigned and two groups with no memory components 112A-N assigned. In such cases, the group distribution module 230 divides the maximum allowable quantity (e.g., 10) by the number of groups with memory components 112A-N assigned (e.g., 3) resulting in 3 memory components 112A-N from each of the three groups being included in the subset for which the BF scan operations are performed. This also leaves just one remaining unassigned memory component 112A-N of the maximum allowable quantity to assign. The group distribution module 230 searches all of the groups for which memory components 112A-N are assigned to find the group with the most (or alternatively least) number of memory components 112A-N assigned. The group distribution module 230 selects a memory component 112A-N from the group with the most (or least) number of memory components 112A-N to include in the subset that is scanned.

The group distribution module 230 provides the subset of memory components 112A-N to the controller to perform the BF scan operations. In a subsequent measurement period, the group distribution module 230 updates the subset of memory components 112A-N with unscanned memory components 112A-N in the same way based on the maximum allowable quantity. In some cases, the group distribution module 230 identifies a top one, two, and/or three group that includes the most or more memory components 112A-N assigned than the remaining groups. The group distribution module 230 can equally or unequally divide the maximum allowable quantity across the identified top one, two, and/or three groups. In this way, the group distribution module 230 selects more memory components from the identified top groups than other groups for inclusion in the subset that is to be scanned by the BF scan operations. For example, the group distribution module 230 can include in the subset five memory components from a first group and four memory components 112A-N from the second group, and one memory component 112A-N from the third group because the first group has more memory components assigned than the second and third groups.

Figure 4:
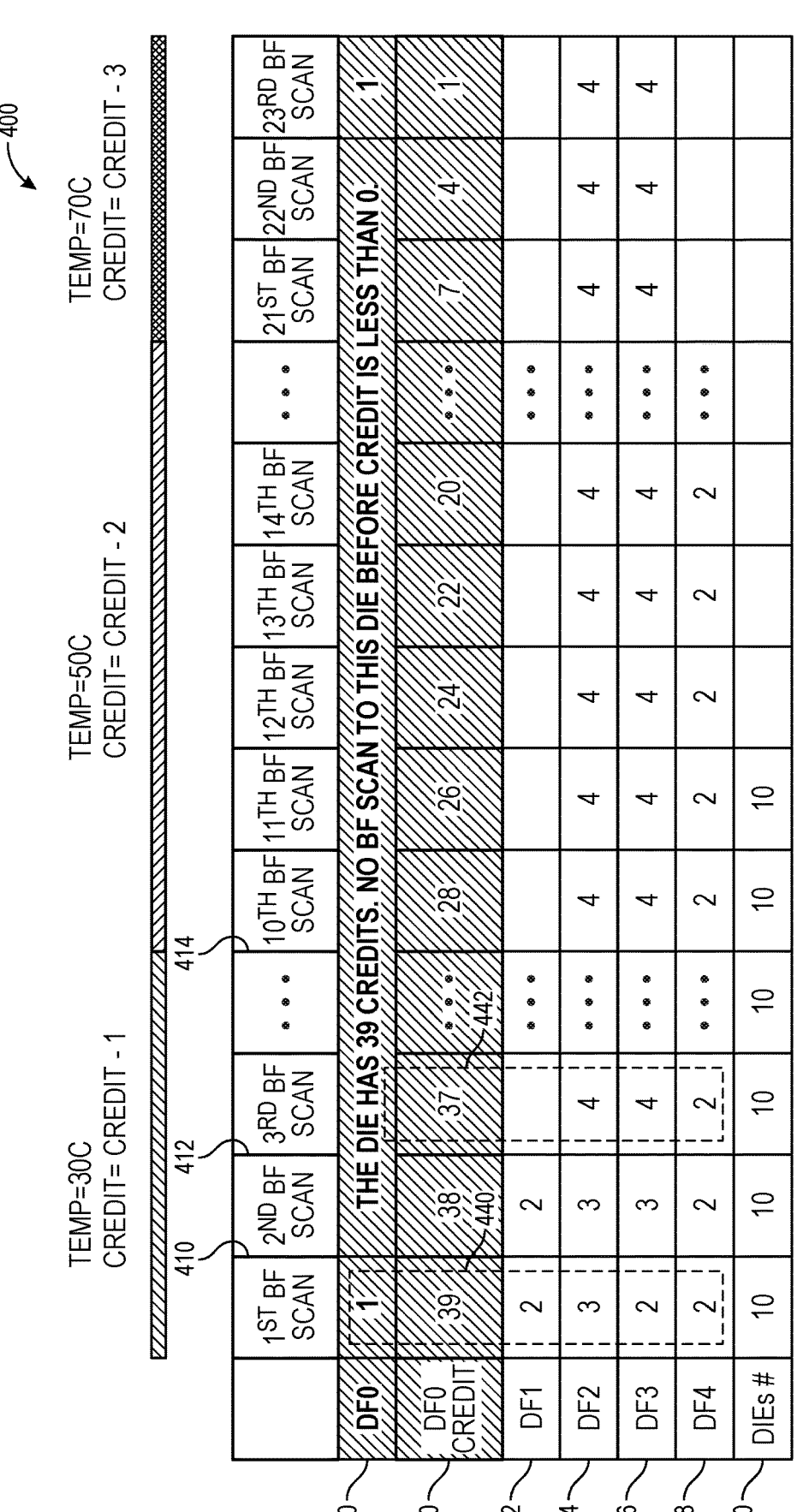
FIG. 4 illustrates dynamic selection of memory components to include in BF scan operations, in accordance with some implementations of the present disclosure.

FIG. 4 illustrates dynamic selection of memory components to include in BF scan operations 400, in accordance with some implementations of the present disclosure. For example, as shown in FIG. 4, five groups (e.g., die families) 420, 422, 424, 426, and 428 are provided, each of which is assigned a different quantity of memory components 112A-N. During a first measurement period 410, the group distribution module 230 selects a first collection of memory components 440. Specifically, the group distribution module 230 can determine that the maximum quantity 430 corresponds to a total of 10 memory components 112A-N that are allowed to be scanned in each measurement period. In this case, the group distribution module 230 forms the first collection of memory components 440 in which one memory component is selected from the first group 420, two memory components are selected from the second group 422, three memory components are selected from the third group 424, three memory components are selected from the fourth group 424, and two memory components are selected from the fifth group 426. In this example, each group is associated and assigned a plurality of memory components which means that at least one memory component is selected from each group for scanning. The group distribution module 230 can determine that the third group 424 is assigned more memory components than any of the other groups. In response, the group distribution module 230 selects three memory components from the third group 424 and fewer memory components (e.g., 2 or 1) from the other groups.

After a plurality of measurement periods have elapsed and the BF scan operations have been performed on different sets of memory components from the five groups 420, 422, 424, 426, and 428, the group distribution module 230 can determine that all of the memory components in the second group 422 have completely been scanned. For example, the second group 422 may have four memory components assigned, meaning that after two measurement periods in which BF scan operations have been performed twice, all of the memory components of the second group 422 are scanned. In this case, in the next measurement period 412, the group distribution module 230 may allocate the two memory components from the second group 422 to the other groups which still have memory components assigned and left to be scanned. Specifically, in the next measurement period 412, the group distribution module 230 forms a second collection of memory components 442 in which one memory component is selected from the first group 420, zero memory components are selected from the second group 422, four memory components (instead of the previous three memory components) are selected from the third group 424, four memory components (instead of the previous three) are selected from the fourth group 426, and two memory components are selected from the fifth group 428. This totals 10 memory components being scanned in the next measurement period 412 corresponding to the maximum quantity 430.

In some examples, the memory component timer module 250 associates a counter or timer (also referred to as a credit) with each BF and with each memory component 112A-N. The counter or timer can have a total quantity of bits corresponding to a maximum time value for each BF and each memory component 112A-N. The counter or timer can count up or can count down until a threshold value is reached and is adjusted each time a BF scan operation is performed in a given measurement period. The counter or timer can be adjusted by a particular amount based on a current temperature associated with the memory components 112A-N. The counter or timer can be initialized based on a temperature of the memory components 112A-N and the bin associated with the BF of the memory component 112A-N.

The timer or counter can represent a number of hours that can elapse before the corresponding memory component 112A-N needs to be scanned by the BF scan operations. When the temperature is in a first range, the counter or timer is incremented/decremented by one, in which case the BF scan operations may be performed once every hour. When the temperature is in a second range, the counter or timer is incremented/decremented by two or twice as much as the first range in order to reach the threshold faster than the adjustment of the counter in the first temperature range. When the temperature is in a third range, the counter or timer is incremented/decremented by three or three times as much as the first range or second range in order to reach the threshold faster than the adjustment of the counter in the first temperature range. Once the timer or counter reaches the threshold value, the memory component timer module 250 causes the memory components 112A-N associated with the counter or timer to be scanned in the next BF scan operations.

For example, as shown in FIG. 4, the first group 420 can include a memory component 112A-N that is associated with a timer, counter or credit 450. This credit 450 is decremented at each measurement period at a rate or amount that is determined or a function of temperature of the memory component 112A-N. Specifically, the credit 450 of the memory component 112A-N can initially be set to 39 (meaning after 39 hours the memory component 112A-N needs to be scanned). The credit 450 is decremented initially in a first set of measurement periods by one, and then as the temperature increases, is decremented by two or three in a second and third set of measurement periods. Eventually, after 23 measurement periods elapse (e.g., less than the 39 hours), the credit 450 reaches 0 or some other threshold value. In response, the memory component 112A-N associated with the credit 450 of the first group 420 is included in the collection of memory components that are scanned in the subsequent measurement period. In some cases, this memory component 112A-N can be excluded from the collection of memory components that are scanned until the credit 450 reaches the threshold value to allow other memory components 112A-N to be scanned.

FIG. 5 is a flow diagram of an example method 500 to perform adaptive BF scan operations, in accordance with some implementations of the present disclosure. Method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the memory sub-system controller 115 or subcomponents of the controller 115 of FIG. 1. In these embodiments, the method 500 can be performed, at least in part, by the BF scan module 200. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 5, the method (or process) 500 begins at operation 505, with the BF scan module 200 of a memory sub-system (e.g., of processor of the memory sub-system controller 115) assigning the set of memory components to one or more groups of a plurality of groups based on respective storage characteristics of the set of memory components, each of the plurality of groups corresponding to different storage characteristics. Then, at operation 510, the BF scan module 200 determines a maximum quantity of memory components to perform BF scan operations at an individual measurement period. The BF scan module 200, at operation 515, distributes the maximum quantity of memory components across the one or more groups to which the set of memory components are assigned and, at operation 520, at the individual measurement period, performs the BF scan operations on a portion of the set of memory components corresponding to the maximum quantity of memory components.

In view of the disclosure above, various examples are set forth below. It should be noted that one or more features of an example, taken in isolation or combination, should be considered within the disclosure of this application.

Example 1. A system comprising: a memory sub-system comprising a set of memory components; and a processing device, operatively coupled to the set of memory components and configured to perform operations comprising: assigning the set of memory components to one or more groups of a plurality of groups based on respective storage characteristics of the set of memory components, each of the plurality of groups corresponding to different storage characteristics; determining a maximum quantity of memory components to perform block family (BF) scan operations at an individual measurement period; distributing the maximum quantity of memory components across the one or more groups to which the set of memory components are assigned; and at the individual measurement period, performing the BF scan operations on a portion of the set of memory components corresponding to the maximum quantity of memory components.

Example 2. The system of Example 1, wherein the maximum quantity of memory components is equally distributed across the one or more groups to which the set of memory components are assigned.

Example 3. The system of any one of Examples 1-2, wherein the maximum quantity of memory components is un-equally distributed across the one or more groups to which the set of memory components are assigned.

Example 4. The system of Example 3, the operations comprising: determining, for each of group of the plurality of groups, a quantity representing how many of the set of memory components is assigned to each of the one or more groups of the plurality of groups; and distributing the maximum quantity of memory components across the one or more groups based on the quantity determined for each group of the plurality of groups.

Example 5. The system of Example 4, the operations comprising: determining that a first quantity of the set of memory components assigned to a first group of the plurality of groups is greater than a second quantity of the set of memory components assigned to a second group of the plurality of groups; and assigning a greater number of the maximum quantity of memory components to the first group than the second group.

Example 6. The system of Example 5, wherein the portion of the set of memory components comprises a first number of the set of memory components assigned to the first group and a second number of the set of memory components assigned to the second group, the first number being greater than the second number.

Example 7. The system of Example 6, the operations comprising: performing the BF scan operations on the first number of the set of memory components and the second number of the set of memory components at the individual measurement period.

Example 8. The system of any one of Examples 4-7, the operations comprising: identifying first and second groups of the plurality of groups that are assigned greater quantities of the set of memory components than a third group of the plurality of groups; and incrementing a quantity of memory components of the first and second groups that are included in the portion of the set of memory components while maintaining a quantity of memory components of the third group at a predetermined amount.

Example 9. The system of any one of Examples 1-8, the operations comprising: associating a bin of a plurality of bins with each of the set of memory components, each of the plurality of bins representing a different measurement period for performing the BF scan operations; and determining the individual measurement period based on the associated bin of each of the set of memory components.

Example 10. The system of Example 9, wherein the plurality of bins is defined according to an elapsed time since data has been programmed into an individual memory component of the set of memory components and a current temperature of the set of memory components.

Example 11. The system of any one of Examples 1-10, the operations comprising: at the individual measurement period, defining the portion to include a first set of the memory components comprising a first quantity of the set of memory components assigned to a first group of the plurality of groups and a second quantity of the set of memory components assigned to a second group of the plurality of groups, the first quantity being different from the second quantity; and at a subsequent measurement period that follows the individual measurement period, defining the portion to include a second set of the memory components comprising the first quantity of the set of memory components assigned to the first group and the second quantity of the set of memory components assigned to the second group.

Example 12. The system of Example 11, the operations comprising: after a plurality of measurement periods, determining that the BF scan operations have been performed on all of the memory components assigned to the first group; and in response to determining that the BF scan operations have been performed on all of the memory components assigned to the first group, incrementing the second quantity of the set of memory components assigned to the second group that is included in the portion to be scanned by the BF scan operations at a later measurement period that is performed after the plurality of measurement periods.

Example 13. The system of any one of Examples 1-12, the operations comprising: associating a counter with each of the set of memory components; and performing the BF scan operations on an individual memory component of the set of memory components before the counter reaches a threshold, wherein the counter is adjusted by an individual amount each time BF scan operations are performed.

Example 14. The system of Example 13, the operations comprising: selecting the individual amount that is used to adjust the counter based on a temperature of the individual memory component, wherein the individual amount comprises a first amount for a first range of temperatures, wherein the individual amount comprises a second amount for a second range of temperatures, the second amount being greater than the first amount and the second range of temperatures being greater than the first range of temperatures.

Example 15. The system of any one of Examples 1-14, wherein the set of memory components comprises a plurality of memory dies.

Example 16. The system of any one of Examples 1-15, wherein the storage characteristics of the set of memory components comprise slow charge loss (SCL) characteristics.

Example 17. The system of Example 16, wherein the different storage characteristics corresponding to each of the plurality of groups comprise different rates of SCL characteristics.

Example 18. The system of any one of Examples 1-17, wherein the BF scan operations comprise: comparing a current slow charge loss (SCL) for an individual memory component to a default SCL associated with a bin assigned to the individual memory component; and changing the bin assigned to the individual memory component based on comparing the current SCL to the default SCL.

Methods and computer-readable storage medium with instructions for performing any one of the above Examples.

Figure 6:
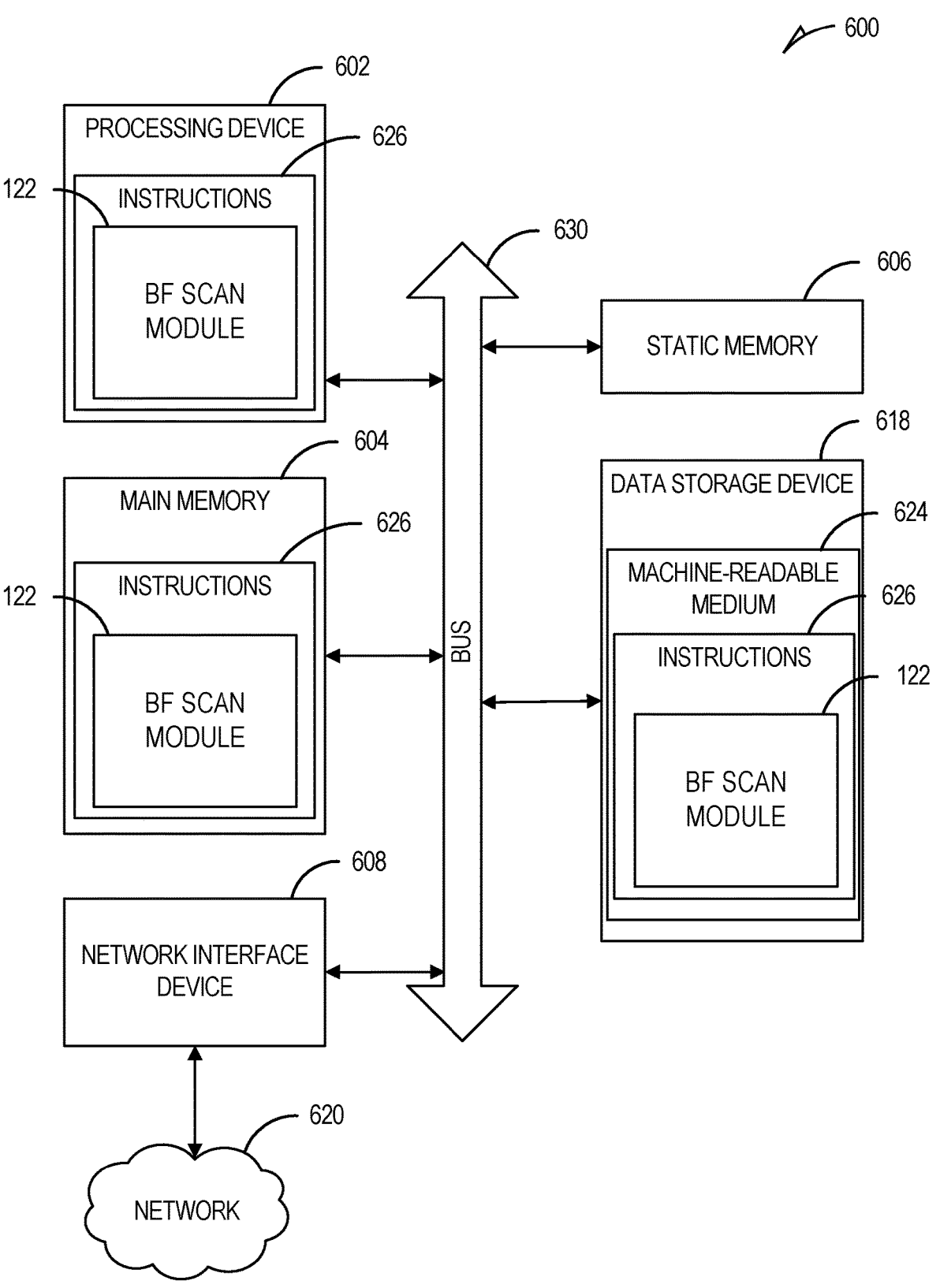
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the BF scan module 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the BF scan module 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:
a memory sub-system comprising a set of memory components; and
a processing device, operatively coupled to the set of memory components and programmed to perform operations comprising:
assigning the set of memory components to one or more groups of a plurality of groups based on respective storage characteristics of the set of memory components, each of the plurality of groups corresponding to different storage characteristics;

determining a reference quantity of memory components representing a maximum number of memory components that are scannable by block family (BF) scan operations at each measurement period of a plurality of measurement periods comprising an individual measurement period;
distributing the reference quantity of memory components across the one or more groups to which the set of memory components are assigned;
selecting a portion of the set of memory components including no more than the maximum number of memory components that are scannable represented by the reference quantity of memory components; and
at the individual measurement period, performing the BF scan operations on the portion of the set of memory components.

2. The system of claim 1, wherein the reference quantity of memory components is equally distributed across the one or more groups to which the set of memory components are assigned.

3. The system of claim 1, wherein the reference quantity of memory components is un-equally distributed across the one or more groups to which the set of memory components are assigned.

4. The system of claim 3, the operations comprising:
determining, for each of group of the plurality of groups, a quantity representing how many of the set of memory components is assigned to each of the one or more groups of the plurality of groups; and
distributing the reference quantity of memory components across the one or more groups based on the quantity determined for each group of the plurality of groups.

5. The system of claim 4, the operations comprising:
determining that a first quantity of the set of memory components assigned to a first group of the plurality of groups is greater than a second quantity of the set of memory components assigned to a second group of the plurality of groups; and
assigning a greater number of the reference quantity of memory components to the first group than the second group.

6. The system of claim 5, wherein the portion of the set of memory components comprises a first number of the set of memory components assigned to the first group and a second number of the set of memory components assigned to the second group, the first number being greater than the second number.

7. The system of claim 6, the operations comprising:
performing the BF scan operations on the first number of the set of memory components and the second number of the set of memory components at the individual measurement period.

8. The system of claim 4, the operations comprising:
identifying first and second groups of the plurality of groups that are assigned greater quantities of the set of memory components than a third group of the plurality of groups; and
incrementing a quantity of memory components of the first and second groups that are included in the portion of the set of memory components while maintaining a quantity of memory components of the third group at a predetermined amount.

9. The system of claim 1, the operations comprising:
associating a bin of a plurality of bins with each of the set of memory components, each of the plurality of bins representing a different measurement period for performing the BF scan operations; and determining the individual measurement period based on the associated bin of each of the set of memory components.

10. The system of claim 9, wherein the plurality of bins is defined according to an elapsed time since data has been programmed into an individual memory component of the set of memory components and a current temperature of the set of memory components.

11. The system of claim 1, the operations comprising:

at the individual measurement period, defining the portion to include a first set of the memory components comprising a first quantity of the set of memory components assigned to a first group of the plurality of groups and a second quantity of the set of memory components assigned to a second group of the plurality of groups, the first quantity being different from the second quantity; and at a subsequent measurement period that follows the individual measurement period, defining the portion to include a second set of the memory components comprising the first quantity of the set of memory components assigned to the first group and the second quantity of the set of memory components assigned to the second group.

12. The system of claim 11, the operations comprising:

after the plurality of measurement periods, determining that the BF scan operations have been performed on all of the memory components assigned to the first group; and in response to determining that the BF scan operations have been performed on all of the memory components assigned to the first group, incrementing the second quantity of the set of memory components assigned to the second group that is included in the portion to be scanned by the BF scan operations at a later measurement period that is performed after the plurality of measurement periods.

13. The system of claim 1, the operations comprising:

associating a counter with each of the set of memory components; and performing the BF scan operations on an individual memory component of the set of memory components before the counter reaches a threshold, wherein the counter is adjusted by an individual amount each time BF scan operations are performed.

14. The system of claim 13, the operations comprising:

selecting the individual amount that is used to adjust the counter based on a temperature of the individual memory component, wherein the individual amount comprises a first amount for a first range of temperatures, wherein the individual amount comprises a second amount for a second range of temperatures, the second amount being greater than the first amount and the second range of temperatures being greater than the first range of temperatures.

15. The system of claim 1, the operations comprising:

identifying first and second groups of the plurality of groups that are assigned greater quantities of the set of memory components than a third group of the plurality of groups; and incrementing a quantity of memory components of the first and second groups that are included in the portion of the set of memory components while maintaining a quantity of memory components of the third group at a predetermined amount.

16. The system of claim 1, the operations comprising:

in response to determining that the BF scan operations have been performed on all of the memory components assigned to a first group of the plurality of groups, incrementing a second quantity of the set of memory components assigned to a second group of the plurality of groups that is included in the portion to be scanned by the BF scan operations at a later measurement period that is performed after the plurality of measurement periods.

17. The system of claim 1, the operations comprising:

associating a counter with each of the set of memory components; and selecting an individual amount that is used to adjust the counter based on a temperature of an individual memory component, wherein the individual amount comprises a first amount for a first range of temperatures, wherein the individual amount comprises a second amount for a second range of temperatures, the second amount being greater than the first amount and the second range of temperatures being greater than the first range of temperatures.

18. The system of claim 1, wherein the BF scan operations comprise:

comparing a current slow charge loss (SCL) for an individual memory component to a default SCL associated with a bin assigned to the individual memory component; and changing the bin assigned to the individual memory component based on comparing the current SCL to the default SCL.

19. A method comprising:

assigning a set of memory components to one or more groups of a plurality of groups based on respective storage characteristics of the set of memory components, each of the plurality of groups corresponding to different storage characteristics;

determining a reference quantity of memory components representing a maximum number of memory components that are scannable by block family (BF) scan operations at each measurement period of a plurality of measurement periods comprising an individual measurement period;

distributing the reference quantity of memory components across the one or more groups to which the set of memory components are assigned;

selecting a portion of the set of memory components including no more than the maximum number of memory components that are scannable represented by the reference quantity of memory components; and at the individual measurement period, performing the BF scan operations on the portion of the set of memory components.

20. A non-transitory computer-readable storage medium comprising instructions that, when executed by a processing device, cause the processing device to perform operations comprising:

assigning a set of memory components to one or more groups of a plurality of groups based on respective storage characteristics of the set of memory components, each of the plurality of groups corresponding to different storage characteristics;

determining a reference quantity of memory components representing a maximum number of memory components that are scannable by block family (BF) scan operations at each measurement period of a plurality of measurement periods comprising an individual measurement period;

distributing the reference quantity of memory components across the one or more groups to which the set of memory components are assigned;

selecting a portion of the set of memory components including no more than the maximum number of memory components that are scannable represented by the reference quantity of memory components; and at the individual measurement period, performing the BF scan operations on the portion of the set of memory components.

* * * * *